US012223982B1

(12) United States Patent
Uchida et al.

(10) Patent No.: US 12,223,982 B1
(45) Date of Patent: Feb. 11, 2025

(54) HEAD VELOCITY DERATING FOR DATA STORAGE DEVICES INCLUDING DISK MEDIA

(71) Applicant: Western Digital Technologies, Inc., San Jose, CA (US)

(72) Inventors: Hiroshi Uchida, Yokohama (JP); Hidehiko Numasato, Hiratsuka (JP); Akira Yokozuka, Yokohama (JP); Shrey Khanna, San Jose, CA (US); Peyman Niazi, Pleasanton, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/395,602

(22) Filed: Dec. 24, 2023

(51) Int. Cl.
*G11B 19/28* (2006.01)
*G11B 5/55* (2006.01)
*G11B 21/12* (2006.01)

(52) U.S. Cl.
CPC ............... *G11B 19/28* (2013.01); *G11B 5/55* (2013.01); *G11B 21/12* (2013.01)

(58) Field of Classification Search
None
See application file for complete search history.

(56) References Cited

U.S. PATENT DOCUMENTS

| | | | |
|---|---|---|---|
| 4,371,903 A * | 2/1983 | Lewis | G11B 5/54 |
| 5,307,338 A * | 4/1994 | Suzuki | G11B 19/20 |
| | | | 360/99.07 |
| 5,633,767 A * | 5/1997 | Boutaghou | G11B 20/1816 |
| 5,889,629 A | 3/1999 | Patton, III | |
| 5,943,307 A * | 8/1999 | Takagi | G11B 7/0946 |
| | | | 369/47.33 |
| 6,140,784 A | 10/2000 | Mazda | |
| 6,169,382 B1 | 1/2001 | McKenzie et al. | |
| 6,396,652 B1 | 5/2002 | Kawachi et al. | |
| 6,496,324 B1 * | 12/2002 | Golowka | G11B 21/22 |
| 6,977,794 B1 | 12/2005 | Sun et al. | |
| 7,573,670 B1 | 8/2009 | Ryan et al. | |
| 9,165,583 B1 | 10/2015 | Beker | |

(Continued)

OTHER PUBLICATIONS

Liu et al., "Characteristics of Ramp Load of Hard Disk Drive with Magnetic Bias and Inertia Latch"; Sep. 2007; Proceedings of ASME 2007 International Design Engineering Technical Conferences & Computers and Information in Engineering Conference.

(Continued)

*Primary Examiner* — Peter Vincent Agustin
(74) *Attorney, Agent, or Firm* — Barry IP Law, P.C.

(57) ABSTRACT

A Data Storage Device (DSD) includes a disk to store data, at least one head to read and write data on the disk, and a Voice Coil Motor (VCM) to move the at least one head over the disk. An upper velocity limit is reduced for moving the at least one head to perform a command to read or write data at a target location on the disk as a precautionary measure against damaging the at least one head during an Emergency Power Off (EPO) state. The upper velocity limit is reduced in response to the target location being in an Outer Diameter (OD) region of the disk, a direction needed to move the at least one head being in an Inner Diameter (ID) to OD direction, and a starting position being at least as radially far from an OD region position as a predetermined threshold.

20 Claims, 6 Drawing Sheets

(56) References Cited

U.S. PATENT DOCUMENTS

| | | |
|---|---|---|
| 9,275,667 B1 | 3/2016 | Abrishamchian et al. |
| 9,972,348 B1* | 5/2018 | Ferris .................. G11B 19/047 |
| 10,014,018 B1 | 7/2018 | Kiyonaga et al. |
| 10,176,840 B1 | 1/2019 | Johnson et al. |
| 10,839,839 B1 | 11/2020 | Uchida et al. |
| 10,930,310 B1 | 2/2021 | Uchida et al. |
| 2002/0141101 A1* | 10/2002 | Brittner .................. G11B 21/12 |
| 2016/0224096 A1* | 8/2016 | Dykes ................ G05D 23/1393 |
| 2023/0091001 A1* | 3/2023 | Hironaka ............... G11B 21/12 |
| | | 360/77.02 |

OTHER PUBLICATIONS

HGST, "Ramp Load/Unload Technology in Hard Disk Drives"; Nov. 2007.

* cited by examiner

HEAD VELOCITY DERATING FOR DATA STORAGE DEVICES INCLUDING DISK MEDIA

BACKGROUND

Data Storage Devices (DSDs) can include one or more disks that are used to magnetically store data. In such DSDs, a head is actuated over the surface of the disk while the disk is spinning to magnetically read data from the disk and to magnetically write data on the disk using the head. The head is supported by a slider assembly that floats over the disk surface at approximately five nanometers due to an air bearing or lifting force of air caused by the rapid spinning of the disk. When the head is not moving or floating over the spinning disk surface, such as during a power up, power down, or low power state of the DSD, the head is parked or unloaded onto a ramp near an outer diameter of the disk to prevent damage to the disk and to the head.

In cases where there is an unexpected power loss (i.e., an Emergency Power Off (EPO) event) while the head is floating over the disk, the head is quickly moved to the ramp using power that may remain in the DSD, such as by using capacitors or a continued spinning of the disk, to help prevent the head from crashing onto the disk surface due to the reduction in lift force caused by the slowing of the spinning disk. In such EPO events, there is also a risk of damaging the head if it hits the ramp with too much speed, which may cause the head-slider assembly to bounce off of the ramp (i.e., "head-slider flapping").

As DSDs become physically smaller and the amount of data being stored on the disks becomes greater, there is an increased risk of the head being damaged during an EPO event. For example, increasing the number of disks that are circumferentially aligned on top of each other in a disk pack of the DSD can decrease the amount of space between the overlapped disks such that the ramp may be steeper and more likely to cause head-slider flapping when hit by the head during an EPO event. However, decreasing the maximum speed of the head during normal operation to prevent damage during a possible EPO event can decrease performance due to the slower movement of the head and can increase the size of an unused outer diameter region of the disk that may be overlapped by the ramp or may serve as a safeguard against possible data loss if the head crashes onto the disk due to the lower maximum speed.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Example System Environments

Figure 1:
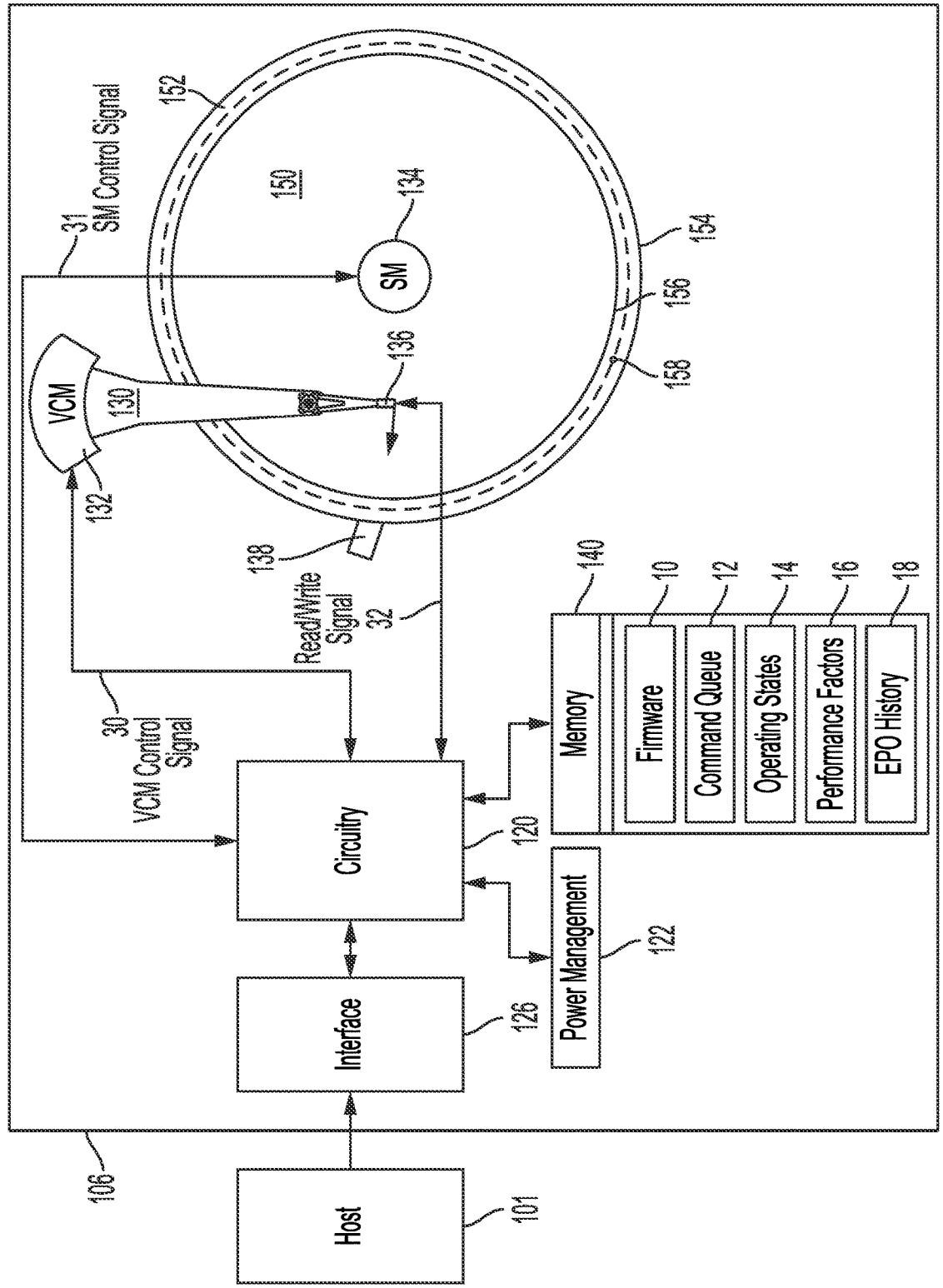
FIG. 1 is a block diagram of an example Data Storage Device (DSD) according to one or more embodiments.

FIG. 1 shows an example of Data Storage Device (DSD) 106, which receives data from host 101 according to one or more embodiments. As shown in the example of FIG. 1, DSD 106 includes Non-Volatile Memory (NVM) in the form of magnetic disk 150. In this regard, DSD 106 may be considered a Hard Disk Drive (HDD) since it includes a rotating magnetic disk. In other embodiments, DSD 106 can include other NVM media in addition to disk 150, such as flash memory or other non-volatile solid-state memory.

As will be appreciated by those of ordinary skill in the art with reference to the present disclosure, disk 150 may form part of a disk pack including multiple disks that are circumferentially aligned with disk 150. In such implementations, head 136 may form part of a Head Stack Assembly (HSA) including heads arranged to read data from and write data to a corresponding disk surface in the disk pack. In this regard, head 136 can move in conjunction with another head under disk 150 to read and write data on a bottom surface of disk 150. As used herein, "at least one head" can refer to a single head, such as head 136, or multiple heads that move together, such as head 136 and a head on the other side of disk 150, or heads that form an HSA.

As shown in FIG. 1, disk 150 includes Outer Diameter (OD) region 152 defined by outer boundary 154 and inner boundary 156, which can correspond to the data writable limits of OD region 152. Disk 150 is rotated by Spindle Motor (SM) 134 and head 136 is positioned to read and write data on the surface of disk 150. In more detail, head 136 is connected to the distal end of actuator 130 which is rotated by Voice Coil Motor (VCM) 132 to position head 136 over disk 150 to read or write data in annular tracks on disk 150. A servo system of circuitry 120 controls the rotation of disk 150 with SM control signal 31 and controls the position of head 136 using VCM control signal 30.

In the example of FIG. 1, DSD 106 includes circuitry 120, which can include one or more processors for executing instructions, such as a microcontroller, a Digital Signal Processor (DSP), an Application-Specific Integrated Circuit (ASIC), a Field Programmable Gate Array (FPGA), hardwired logic, analog circuitry and/or a combination thereof. In one implementation, circuitry 120 can include a System on a Chip (SoC), which may also include memory 140 or other local memory.

Interface 126 is configured to enable DSD 106 to communicate with host 101, and may use, for example, Serial Advanced Technology Attachment (SATA), Peripheral Component Interconnect express (PCIe), Small Computer System Interface (SCSI), Serial Attached SCSI (SAS), Ethernet, or WiFi, and/or one or more other standards. As will be appreciated by those of ordinary skill in the art, interface 126 can be included as part of circuitry 120. Although FIG. 1 depicts the co-location of host 101 and DSD 106, in other implementations, the two need not be physically co-located. In such implementations, DSD 106 may be located remotely from host 101 and connected to host 101 via a network interface.

Memory 140 can include, for example, a Dynamic Random Access Memory (DRAM) or other type of solid-state memory, such as Static Random Access Memory (SRAM) or flash memory. While the description herein refers to solid-state memory generally, it is understood that solid-state memory may comprise one or more of various types of memory devices such as flash integrated circuits, Chalcogenide RAM (C-RAM), Phase Change Memory (PC-RAM), Programmable Metallization Cell RAM (PMC-RAM), Ovonic Unified Memory (OUM), Resistive RAM (RRAM), NAND memory (e.g., Single-Level Cell (SLC) memory, Multi-Level Cell (MLC) memory, Triple-Level Cell (TLC) memory, or any combination thereof), NOR memory, EEPROM, Ferroelectric Memory (FeRAM), Magnetoresistive RAM (MRAM), 3D XPoint memory, other discrete NVM chips, or any combination thereof.

Data stored in memory 140 can include data read from disk 150, data to be stored on disk 150, instructions loaded from firmware 10 for execution by circuitry 120, and/or data used in executing firmware 10. In the example of FIG. 1, memory 140 also stores command queue 12, operating states 14, performance factors 16, and Emergency Power Off (EPO) history 18. Command queue 12 can include commands that are waiting to be performed on disk 150, such as write commands or read commands. In some implementations, command queue 12 may be used as part of a Rotational Position Optimization (RPO) algorithm to schedule and order the performance of commands so as to reduce an overall amount of seek time and waiting time until a target data sector reaches head 136 and/or other heads that may be attached to actuator 130. The RPO algorithm may also consider a Quality of Service (QoS) or timeout value for performing commands and may also consider a velocity derating setting as discussed in more detail below to reduce a speed of head 136 in certain conditions.

In this regard, circuitry 120 can reduce or derate an upper velocity limit of head 136 to reduce the speed of head 136 as a precautionary measure against damaging the head and/or disk surface during an EPO state where head 136 is moved to ramp 138 as the spinning of disk 150 slows due to the unexpected loss of power. Conventional DSDs may limit the velocity for moving a head as a precaution against the head hitting the ramp with too much speed. However, unlike conventional DSDs, the precautionary reduction in velocity is controlled in the present disclosure in response to, or based on, multiple factors to reduce the impact on performance in terms of the average number of Input/Output Operations Per Second (IOPS) being performed on the disk.

For example, the upper velocity limit may only be reduced for commands to be performed in OD region 152 (e.g., at target location 158) and if the direction needed to move head 136 is in an Inner Diameter (ID) to OD direction as shown by the arrow from head 136 in FIG. 1 toward ramp 138. In addition, the upper velocity limit may only be reduced in response to, or based on, a starting position of head 136 being at least as radially far from an OD region position as a predetermined threshold. In such an example, the OD region position can correspond to a boundary of OD region 152, such as outer boundary 154 or inner boundary 156, an annular track for target location 158 (i.e., the dashed track shown in OD region 152 in FIG. 1), or a predetermined position in OD region 152, such as a radial midpoint of OD region 152. This condition can ensure that the upper velocity limit is only reduced for relatively long seeks to the OD region when head 136 reaches a higher velocity with more momentum and has a greater risk of contacting ramp 138 with too much force in the event of an EPO when head 136 is traveling at a maximum velocity.

Power management 122 of DSD 106 may detect a power loss and notify circuitry 120, which in turn, can execute portions of firmware 10 to move head 136 onto ramp 138 via VCM 132. Power management 122 can include, for example, a Power Large Scale Integrated Circuit (PLSI) or other Power Management Integrated Circuit (PMIC).

In some implementations, the upper velocity limit may also be reduced based at least in part on operating states determined by circuitry 120 and included in operating states 14 stored in memory 140. Operating states 14 can include, for example, temperature conditions such as a junction temperature for power management 122 and/or circuitry 120 or other temperature measured for another component in DSD 106, which can be measured or estimated by circuitry 120 during a manufacturing test process or during real-time operations in the field. Operating states 14 can additionally or alternatively include one or more characteristics of SM 134 (e.g., a torque constant (Kt), a coil resistance, and/or an inductance), and/or one or more characteristics of VCM 132 (e.g., a torque constant, a coil resistance, and/or an inductance). The foregoing operating states of DSD 106 can provide for an adjustable reduction in the upper velocity limit that may be tailored to the specific conditions or characteristics of DSD 106, which may differ from those of another DSD of even the same model of DSD. In addition, the operating states can be updated in the field to account for aging of the VCM and/or spindle motor, which may affect the speed of head 136 during the seek or during an EPO state, such as by affecting an acceleration or deceleration of head 136, an amount of current needed by VCM 132 for head 136 to reach a particular velocity, or a relationship between an amount of rotation of disk 150 before reaching a target location.

For example, a lower torque constant for VCM 132 can translate to reducing the upper velocity limit by more since the lower torque constant makes it more difficult for the head to decelerate from a high velocity to a lower safe velocity during an EPO event. As another example, a higher temperature measured in DSD 106 (e.g., greater than a threshold temperature) can correspond to reducing the upper velocity limit by more since the higher temperature can make it more difficult for VCM 132 to slow down from a high velocity to the lower safe velocity during an EPO event due to a decrease in torque constant caused by the increased temperature. As yet another example, a greater coil resistance of VCM 132 can correspond to a less efficient motor that may need a higher current to slow down from a high velocity to a lower safe velocity during an EPO event, which may affect a velocity derating setting used to reduce the upper velocity limit. As another example, a lower measured inductance of VCM 132 by circuitry 120 may correspond to a faster speed for actuator 130 that may call for an increased velocity derating for head 136 than for a different head in a different DSD with a VCM having a greater measured inductance. In addition, the inductance may be used to measure degradation or aging of the motor so that the velocity derating setting may change over time to compensate for increased motor inefficiency.

In some implementations, the upper velocity limit may also be reduced based at least in part on performance factors determined by circuitry 120 and included in performance factors 16 stored in memory 140. Performance factors 16 can include, for example, a data size for a command, a number of pending commands to be performed on disk 150 (e.g., a size of command queue 12), and/or a distance between the starting position of head 136 and target location 158 (i.e., a seek distance). In cases where the reduction in the upper velocity limit has less of an impact on performance (e.g., a lower effect on IOPS), the upper velocity limit may be reduced further to better safeguard head 136 from damage during a potential EPO state. For example, at least one of a data size for data to be read or written for a command being larger than a threshold data size, a number of pending commands to be performed being larger than a threshold number of commands, and/or a seek distance shorter than a threshold seek distance can favor further reducing the upper velocity limit since the reduced velocity seek will have less of an overall impact on performance in these cases.

On the other hand, the upper velocity limit may be reduced less for cases where the overall effect on performance is greater due to the performance factors. In this regard, the overall performance of commands in terms of IOPS will be more impacted by smaller data sizes for commands, less pending commands in a command queue, and/or a longer seek distance since a relatively longer amount of the total time for seeking and performing the command or commands is spent moving to the target location as compared to when the data size is larger, the command queue is shorter, and/or the seek distance is longer.

In some implementations, the upper velocity limit may also be reduced based at least in part on an EPO history determined by circuitry 120 and included in EPO history 18 stored in memory 140. EPO history 18 can include, for example, a count of EPO events for DSD 106 and/or an indication of time since a last EPO event for DSD 106. In such implementations, the upper velocity limit may be reduced further for a higher count of previous EPO events to safeguard against a cumulative effect on head 136 of impacts against ramp 138 during the EPO events. The upper velocity limit may be further decreased, for example, after a threshold number of EPO events.

Similarly, the upper velocity limit may be reduced based at least in part on an indication of time since a last EPO event. A shorter indication of time since a previous EPO event (e.g., less than a predetermined time period) may make another EPO event more likely, such as during factory testing of DSD 106 when there may be a series of EPO events. The upper velocity limit may be further reduced for seeks to the OD region to protect against damage to head 136 during additional EPO events.

Those of ordinary skill in the art will appreciate with reference to the present disclosure that other implementations may include a different number or arrangement of components than those shown in FIG. 1. For example, other implementations may include multiple hosts communicating with DSD 106 or pools of disks or disk packs for storing data. As another example variation, one or more of operating states 14, performance factors 16, or EPO history 18 may not be included in implementations that may not consider such factors in determining a velocity derating setting or reduced upper velocity limit. In addition, one or more of operating states 14, performance factors 16, or EPO history 18 may be combined into a single data structure.

Figure 2A:
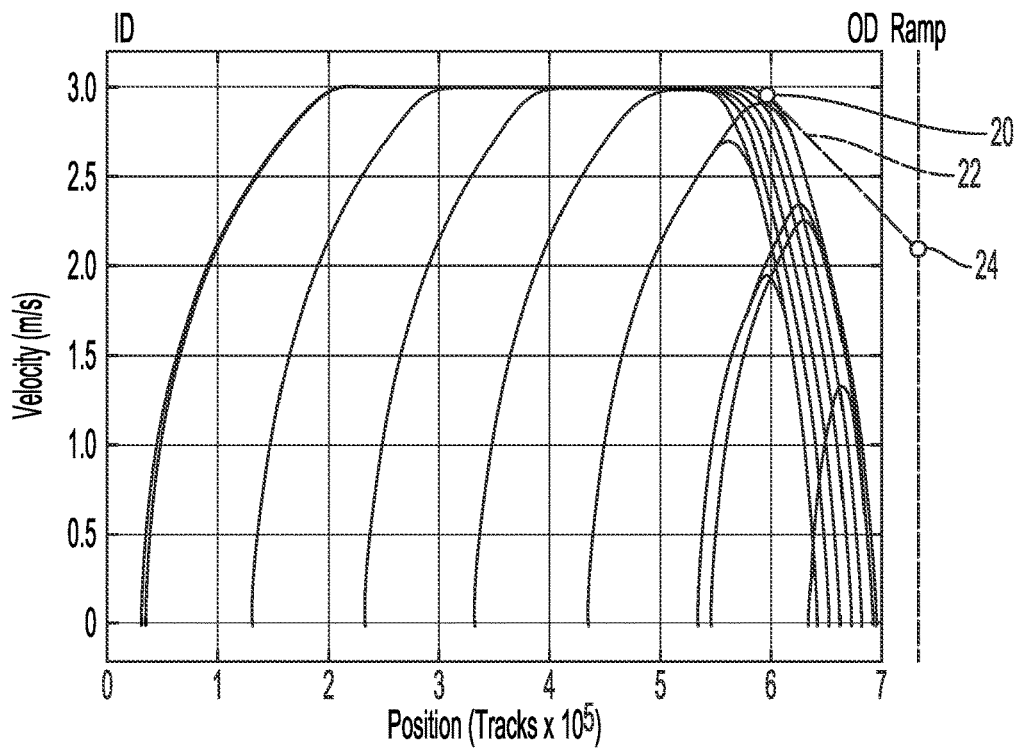
FIG. 2A is a graph of head trajectories of a DSD according to the prior art.

FIG. 2A is a graph of head trajectories of a DSD according to the prior art. As shown in FIG. 2A, a head moves from different positions on a disk (measured in tracks along the x-axis) to OD target locations on the disk in an ID to OD direction. Each of the four head trajectories that begin outside from about $3.4 \times 10^5$ tracks (i.e., lower numbered tracks along the x-axis) reach an upper velocity limit or maximum velocity of about 3.0 meters per second (m/s). Worst case EPO position 20 indicates a position along the head trajectories where an EPO event can cause the most damage to the head because the velocity is at its highest point relatively close to the ramp. Dashed line 22 represents a worst case deceleration curve of the head before it contacts the ramp. As shown in FIG. 2A, the velocity at impact against the ramp for the worst case deceleration during an EPO event (i.e., an EPO event occurring at EPO position 20) is approximately 2.1 m/s at position 24 where deceleration curve 22 intersects the ramp position.

Notably, the three trajectories that begin closest to the OD do not reach the upper velocity limit or maximum velocity of 3.0 m/s or close to this maximum velocity before decelerating to reach the farthest or most extreme target location near the outer boundary of the OD. Accordingly, the deceleration curves for an EPO event occurring at or near the peak velocity for these trajectories will result in a lower velocity when the head contacts the ramp than for trajectories that start from farther away from the OD.

Figure 2B:
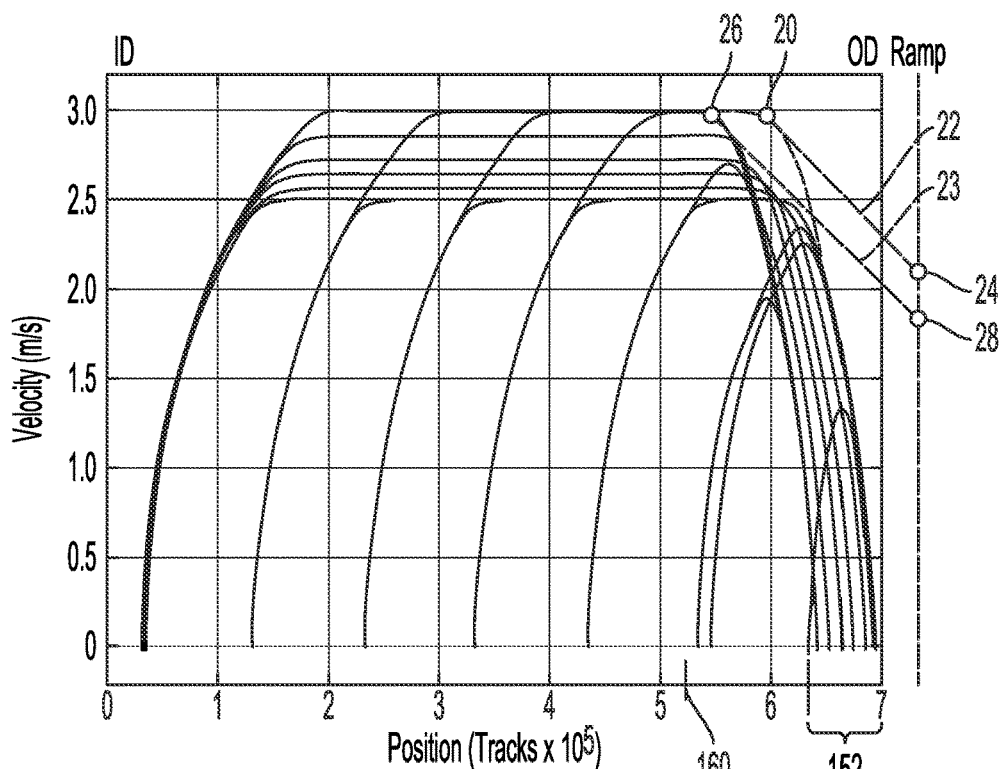
FIG. 2B is a graph of derated head trajectories of a DSD according to one or more embodiments.

FIG. 2B is a graph of derated head trajectories of a DSD according to one or more embodiments. As shown in FIG. 2B, the velocity when hitting the ramp can be lowered for the worst case deceleration curve from position 24 down to position 28, which has a lower velocity of approximately 1.8 m/s. This is about the same worst-case velocity that would result from limiting the upper velocity limit for all seeks to 2.5 m/s. However, unlike other solutions that may impose a fixed upper velocity limit for all seeks to an OD region, the present disclosure considers whether the starting position of the head for the seek is at least as radially far from an OD region position as a predetermined threshold (i.e., a long seek) because not all seeks or trajectories need to be limited to significantly reduce the worst case ramp touch velocity.

In the example of FIG. 2B, the OD region position can be an outer boundary of OD region 152 such that seeks that start from a position outside of threshold position 160 heading in an ID to OD direction for a target location in OD region 152 are reduced, since such seeks would otherwise reach a maximum velocity above deceleration curve 23. In some implementations, OD region 152 may represent an outer 8% of the disk's writable surface and threshold position 160 may represent a position at approximately 22% of the disk's outer writable surface or 22% of a full seek across the disk surface starting from the OD.

In other implementations, threshold position 160 can represent a different predetermined distance or threshold from an OD region position than when the OD region position is an outer boundary of OD region 152. For example, threshold position 160 can represent a predetermined threshold from an OD region position that is a track for the target location within OD region 152 for a particular seek. In other examples, threshold position 160 can represent a predetermined threshold from an ID boundary of OD region 152 or another predetermined position in OD region 152, such as an annular midpoint in OD region 152, which may also be represented by the dashed track on disk 152 in the example of FIG. 1.

By only limiting certain seeks, the performance of the DSD can be improved since the maximum velocity or upper velocity limit is only reduced for longer seeks (i.e., a greater distance between the OD region position and the starting position). This effectively pushes back the worst case EPO position toward the ID from position 20 to position 26, resulting in the lower worst case ramp touch velocity at position 28 when the head touches the ramp.

In addition, the degree of derating of the maximum velocity or amount of reduction of the upper velocity limit can depend on the relative position of the target location in OD region 152, as shown in FIG. 2B. Trajectories with target locations closer to the outer boundary of OD region 152 have upper velocity limits that are reduced more, while trajectories with target locations closer to the inner boundary of OD region 152 have upper velocity limits that are reduced less. This variable reduction in upper velocity limits can fit to the new worst case EPO deceleration curve 23. The variation of upper velocity limits enables additional performance gains by allowing the head to move faster to certain target locations that are closer to the inner boundary of OD region 152 than for target locations that are closer to the outer boundary of OD region 152, even with the same trajectory starting position.

As discussed above, target locations that are not in OD region 152 do not even need to have derated upper velocity limits, since they would not otherwise cause the worst-case EPO ramp touch speed. The derating of the maximum velocity can be limited to cases where the target location is in OD region 152, the starting head position for the seek is at least as far from an OD region position as a predetermined threshold, and the direction of the seek is in an ID to OD direction. By limiting the upper velocity derating to these conditions, and by further adjusting for different levels of upper velocity derating depending on the proximity of the target location to the OD boundary, the worst case ramp touch speed can be lowered as much as if the maximum seek velocity were lowered from 3.0 m/s to 2.5 m/s for all seeks to the OD region, while still enabling many other seeks to the OD region to reach higher velocities to improve performance.

Figure 3A:
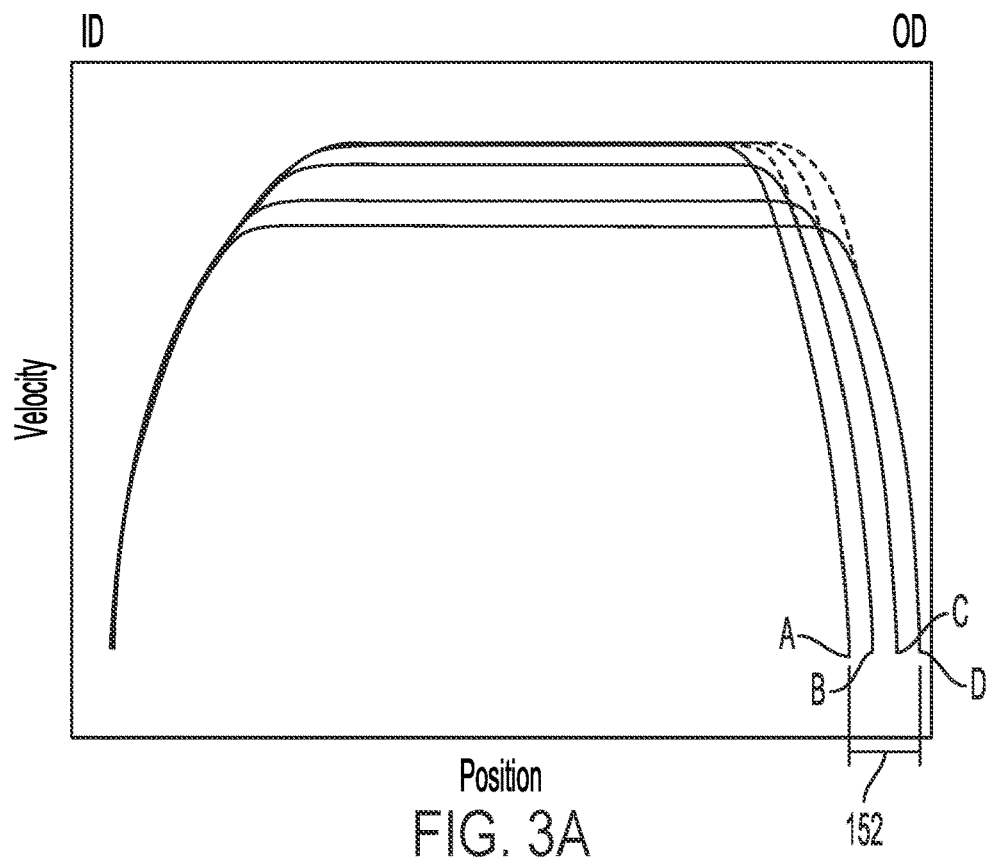
FIG. 3A is a graph of derated head trajectories for different target locations in an Outer Diameter (OD) region of a disk according to one or more embodiments.

FIG. 3A is a graph of derated head trajectories for different target locations in an OD region according to one or more embodiments. As shown in the example of FIG. 3A, the upper velocity limit for a seek may be derated or reduced depending on the relative position of the target location in OD region 152. When the target location is at position D, the upper velocity limit is reduced the most since target location D is the closest to the OD boundary. When the target location is at position A, the upper velocity limit is reduced the least, or not at all, since target location A is the farthest from the OD boundary.

The dashed curves in the upper right portion of FIG. 3A show what the trajectories for target locations B, C, and D would be without derating or reducing the upper velocity limits for these seeks. An EPO event occurring in these dashed regions of the non-derated trajectories would result in the worst case ramp touch speeds that could cause the most damage to the head. The different upper velocity limits can be reduced to the solid line trajectories for target locations B, C, and D by determining a velocity derating setting. In some implementations, the velocity derating setting can be associated with an amount of rotation of the disk before reaching the target location. In some cases, this can be referred to as a Just-In-Time (JIT) seek delay or JIT clip that may be used as part of the RPO algorithm for scheduling commands based on their locations on one or more disk surfaces to reduce the movement of the actuator and/or to otherwise improve the QoS for performing the commands. In such cases, the different upper velocity limits (i.e., the horizontally flat portions of the trajectories in FIG. 3A) can correspond to different amounts of slowing in terms of disk rotation. In other implementations, the velocity derating setting can include, for example, the upper velocity limit itself, an upper current limit supplied to the VCM during the seek for moving the actuator, or a time to reach the target location.

Figure 3B:
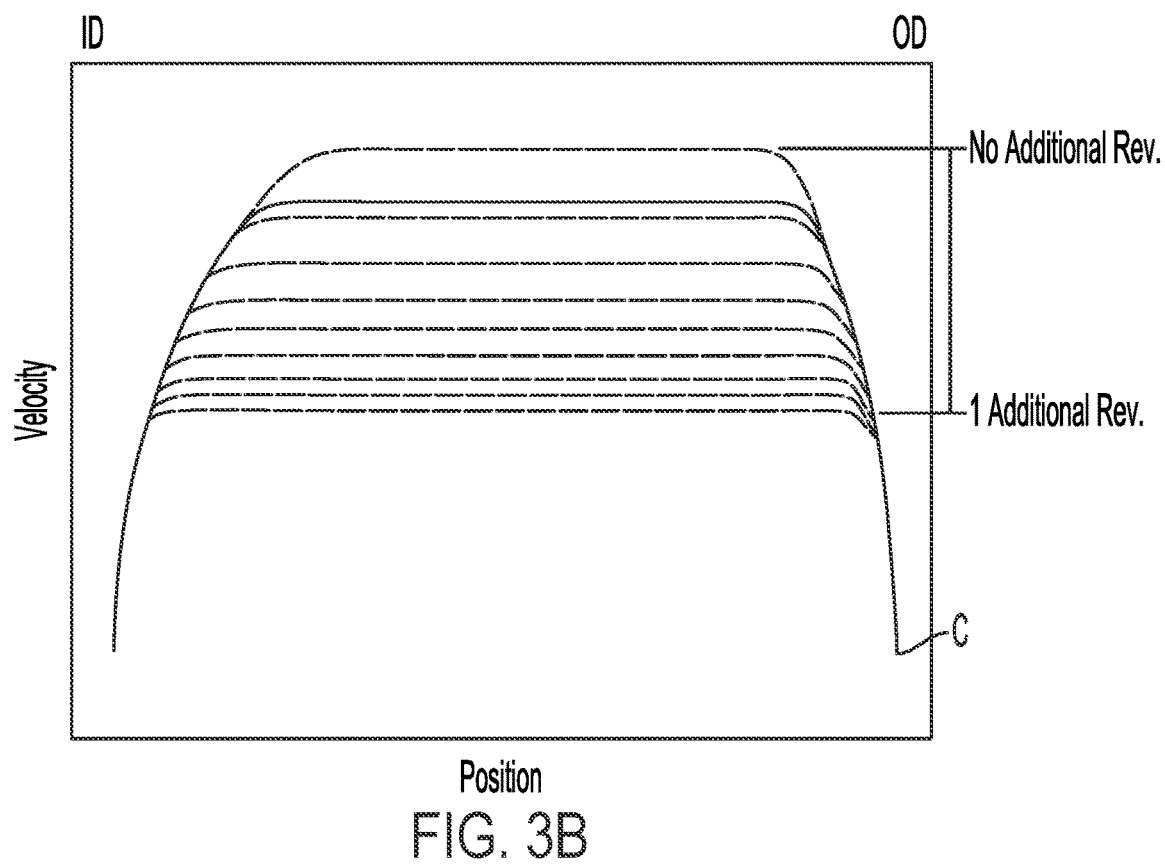
FIG. 3B is a graph of different derated upper velocity limits for a target location in FIG. 3A based on the adjustment of a velocity derating setting according to one or more embodiments.

This is shown in FIG. 3B for target position C from FIG. 3A. The solid line represents the trajectory resulting from the selected or determined velocity derating setting based at least in part on the relative position of target location C in OD region 152. The dashed lines in FIG. 3B represent other possible trajectories in terms of JIT seeks that correspond to other velocity derating settings that have not been selected or determined for target location C. As shown in the example of FIG. 3B, the different possible velocity derating settings range from a slowing of the head by a time taken for zero revolutions of disk 150 to a time taken for one full revolution of disk 150 at an operating angular velocity for performing commands on disk 150.

As will be appreciated by those of ordinary skill in the art with reference to the present disclosure many more possible fractions of a disk revolution time between the time taken for zero and one revolution are available for reducing the upper velocity limit than shown in the example of FIG. 3B. For example, some implementations can utilize 255 different velocity derating settings between the time taken for zero and one revolution with different JIT seeks used in an RPO algorithm. Advantageously, the RPO algorithm can then perform command scheduling to improve Input/Output (IO) performance, even if some seek velocities are derated.

Example Processes

Figure 4:
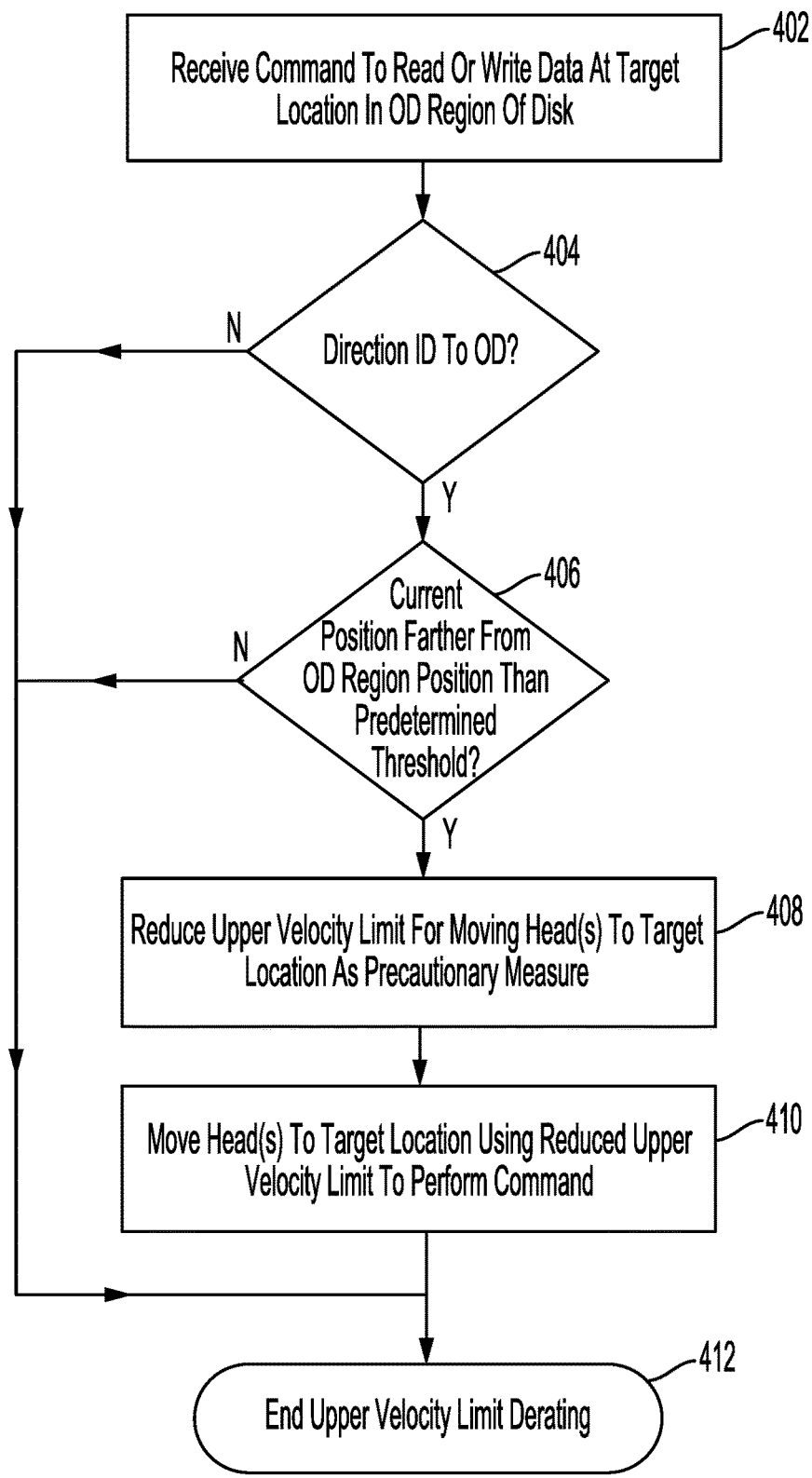
FIG. 4 is a flowchart for an upper velocity limit reduction process according to one or more embodiments.

FIG. 4 is a flowchart for an upper velocity limit reduction process according to one or more embodiments. The process of FIG. 4 can be performed by, for example, circuitry 120 of DSD 106 executing firmware 10 in FIG. 1. In this regard, circuitry 120 can, in some implementations, comprise a means for performing the functions of the upper velocity limit reduction process of FIG. 4. The upper velocity limit reduction process of FIG. 4 can be performed as a precautionary measure against damaging at least one head of the DSD (e.g., head 136 in FIG. 1 and additional heads that may be moved by actuator 130 and VCM 132) during an EPO state of the DSD to avoid a worst case ramp touch speed.

In block 402, a command is received to read or write data at a target location in an OD region of a disk (e.g., OD region 152 in FIG. 1). The command may be received from a host, such as host 101 in FIG. 1. In other examples, the command may come from the DSD itself, such as for a maintenance operation that reads and rewrites data onto the disk. In some cases, the OD region can represent a certain percentage or outer area of the disk surface (e.g., an outer annular 8% of a writable area of a disk surface) that presents the greatest risk of damage to at least one head of the DSD if an EPO event or unexpected power loss occurs when the at least one head is moving toward such an OD region at a high velocity (e.g., 3 m/s).

In block 404, it is determined whether the at least one head needs to move in an ID to OD direction to perform the command (e.g., the direction shown for head 136 in FIG. 1 toward ramp 138). The direction of the seek may be determined by, for example, considering a current position of the at least one head as indicated by servo information provided on the disk and comparing it to the target location for performing the command.

As discussed above, the present disclosure attempts to reduce the number of seeks or movements of the at least one head that will have its upper velocity limit reduced to lessen the performance penalty (e.g., in terms of IOPS), while helping to safeguard against damage to the at least one head due to an unexpected power loss. If the direction of the seek is not in an ID to OD direction in block 404, the process of FIG. 4 proceeds to block 412 to end the upper velocity limit derating.

On the other hand, if it is determined that the direction of the seek will be in the ID to OD direction, it is determined in block 406 whether the current position or a starting position of the at least one head for the seek is at least as far from an OD region position as a predetermined threshold, such as a number of tracks on the disk or other measure of distance of travel for the at least one head to reach the OD region position. The OD region position can include, for example, a boundary of the OD region (e.g., inner boundary 156 or outer boundary 154 in FIG. 1), a track for the target location for performing the command (e.g., the track for target location 158 in FIG. 1), or a predetermined position in the OD region, such as a midpoint between the boundaries of the OD region. If the starting position of the at least one head is not farther or at least as far from the OD region position by the predetermined threshold, the process of FIG. 4 proceeds to block 412 to end the upper velocity limit derating.

On the other hand, if it is determined in block 406 that the starting position of the at least one head is or will be at least as far from the OD region position at the start of the seek as the predetermined threshold, the upper velocity limit for moving the at least one head to the target location is reduced in block 408 as a precautionary measure against damaging the at least one head when contacting the ramp to park the at least one head during an EPO state. In this regard, the conditions of the target location being in the OD region, the direction of the required seek to perform the command being in an ID to OD direction, and the starting seek position being at least as radially far from the target location as the predetermined threshold can be seen as criteria that need to be met for reducing the upper velocity limit.

In some implementations, this may be performed by using a function that is calculated or evaluated by the circuitry to determine a velocity derating setting, if any is needed, that slows the movement of the head, such as a JIT clip, a current limit for a VCM, an upper velocity limit, or a time to reach the target location. In some cases, if one of the inputs have a value indicating the target location is outside the OD region, the seek direction will instead be in an OD to ID direction, or the starting position is not at least as far from the OD region position as the predetermined threshold, the evaluated function can have a value of zero indicating that there is no derating of the upper velocity limit (e.g., a JIT clip of zero revolution time delay).

In block 410, the at least one head is moved to the target location using the reduced upper velocity limit to perform the command. As discussed above, in some implementations, the derating of the upper velocity limit may be scaled or vary in degree depending on a relative position of the target location within the OD region such that the upper velocity limit is derated or reduced more for target locations closer to the outer boundary of the OD region than for other target locations that are closer to the inner boundary of the OD region. This can further serve to reduce the performance penalty of the safety measure of derating the upper velocity limit. In addition, this can allow for a greater OD portion of the disk to be usable for reading and writing data than would otherwise be allowed if only derating the upper velocity limit for seeks to the OD region regardless of the relative position of the target location within the OD region since a greater outer portion of the OD region may be reserved or not used for data storage to prevent the at least one head from causing a thermal erasure or scratch if the at least one head is not able to make it to the ramp with a further reduced velocity.

Those of ordinary skill in the art will appreciate with reference to the present disclosure that other implementations of the upper velocity limit reduction process of FIG. 4 may differ. For example, in some implementations, the reduction of the upper velocity limit in block 408 may occur or overlap with the beginning of movement of the head in block 410 to the target location before reaching the upper velocity limit determined in block 408. As another example variation, the process of FIG. 4 may separately consider whether the target location is in an OD region from the receipt of the command, or the determination of the three criteria discussed above (i.e., target location in the OD region, ID to OD direction of seek, and starting position's radial distance from an annular OD region position) may instead occur at the same time or overlap as discussed above by evaluating or calculating a function that considers the three criteria for reducing the upper velocity limit. In this regard, the velocity derating setting determination process of FIG. 5 discussed below may serve as a sub-process of the upper velocity limit reduction process of FIG. 4 or may effectively implement the functions of FIG. 4 by determining a velocity derating setting that considers the three criteria for the upper velocity limit reduction process of FIG. 4.

Figure 5:
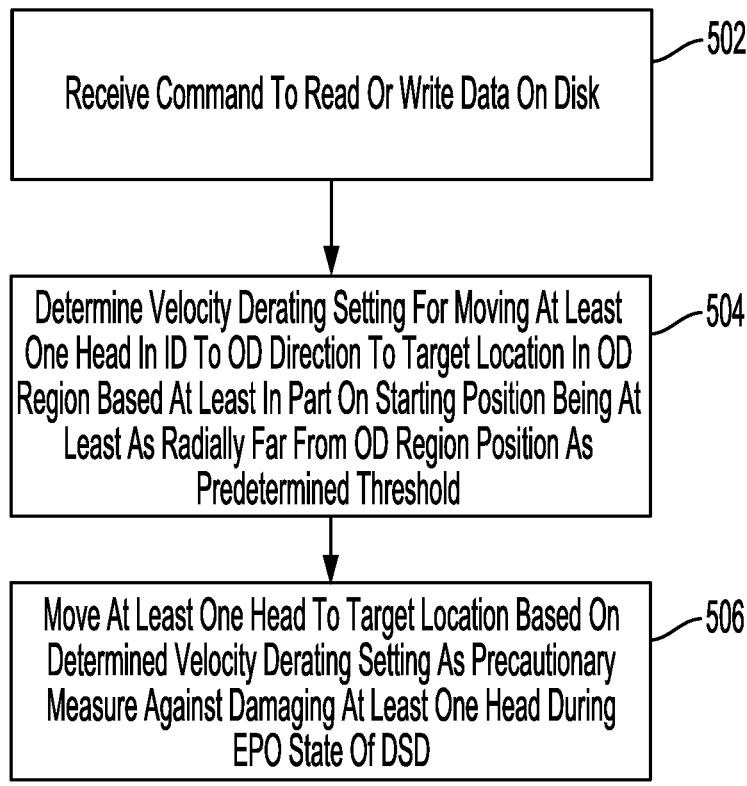
FIG. 5 is a flowchart for a velocity derating setting determination process according to one or more embodiments.

FIG. 5 is a flowchart for a velocity derating setting determination process according to one or more embodiments. The process of FIG. 5 can be performed by, for example, circuitry 120 of DSD 106 executing firmware 10 in FIG. 1. In this regard, circuitry 120 can, in some implementations, comprise a means for performing the functions of the velocity derating setting determination process of FIG. 5.

In block 502, a command is received, such as from host 101 in FIG. 1, to read or write data on a disk of the DSD. In other examples, the command may come from the DSD itself, such as for a maintenance operation that reads data from the disk and rewrites the data onto the disk in the same location or a different location.

In block 504, the circuitry determines a velocity derating setting for moving at least one head of the DSD in an ID to OD direction to a target location in an OD region of the disk. The velocity derating setting is determined based at least in part on a starting position of the at least one head for a seek operation to the target location being at least as radially far as a predetermined threshold from an OD region position. In some implementations, the predetermined threshold can be a predetermined number of tracks on the disk that will need to be traversed from the starting position to reach the target location. In other implementations, the predetermined threshold can be a particular distance, such as a displacement value of the at least one head to reach the target location or a number of tracks between the starting location and another position in the OD region, such as an inner boundary of the OD region, an outer boundary of the OD region, or a midpoint of the OD region.

In determining the velocity derating setting, the circuitry may consider additional factors, such as a relative position of the target location within the OD region as discussed above with reference to FIG. 3A, operating states and/or performance factors of the DSD as discussed below with reference to FIG. 6, and/or an EPO history of the DSD as discussed below with reference to FIG. 7. In some implementations, the velocity derating setting can be determined with a function that weights the different factors to result in the velocity derating setting. In such implementations, the direction of the seek and the target location being in the OD region may have values of one for an ID to OD direction and target location in the OD region, respectively, while the direction of the seek being in an OD to ID direction or the target location being outside the OD region (i.e., in a middle diameter region or ID region of the disk) can have a value of zero that results in no velocity derating.

The velocity derating setting can correspond to a rotational slowing of the at least one head's movement in some implementations. The rotational slowing can include, for example, a JIT clip where slowing is introduced into the seek in terms of a fraction of up to a full rotation time of the disk. In other implementations, the determined velocity derating setting can be the upper velocity limit that is reduced, as in the upper velocity limit reduction process of FIG. 4 discussed above, or the determined velocity derating setting can specify a maximum current to be supplied to the VCM may so as not to exceed a derated upper velocity limit. In yet other implementations, the determined velocity derating setting can include a time for reaching the target location as opposed to an amount of rotation of the disk.

In block 506, the at least one head is moved to the target location based on the determined velocity derating setting. The derated velocity setting serves as a precautionary measure against damaging the at least one head during an EPO state or unexpected power loss of the DSD. As shown in the example of FIG. 2B, lowering the velocity of the at least one head for certain types of seeks using a velocity derating setting (e.g., JIT clip) can reduce a ramp touch velocity for the worst case EPO scenario while enabling a greater upper velocity for most other seeks to the OD region, thereby improving an overall performance of the DSD in terms of IOPS, as compared to conventional precautionary measures that may reduce the upper velocity limit for all seeks to the OD region.

Those of ordinary skill in the art will appreciate with reference to the present disclosure that other implementations of the velocity derating setting determination process of FIG. 5 may differ. For example, the circuitry may first perform a series of checks to determine if the upper velocity limit should be reduced as with the example process of FIG. 4 discussed above. As another example variation, the performance of blocks 504 and 506 may overlap, such as cases where the movement of the at least one head may begin before reaching a reduced upper velocity limit.

Figure 6:
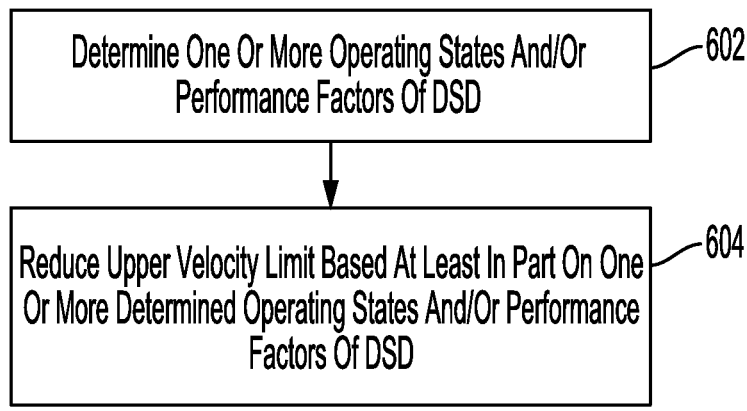
FIG. 6 is a flowchart for an upper velocity limit reduction process based on at least one of determined DSD operating states and DSD performance factors according to one or more embodiments.

FIG. 6 is a flowchart for an upper velocity limit reduction process based on at least one of determined operating states and performance factors according to one or more embodiments. The process of FIG. 6 can be performed by, for example, circuitry 120 of DSD 106 executing firmware 10 in FIG. 1. In this regard, circuitry 120 can, in some implementations, comprise a means for performing the functions of the upper velocity limit reduction process of FIG. 6. The process of FIG. 6 can, in some implementations, be performed in addition to or as part of the upper velocity limit reduction process of FIG. 4 or the velocity derating setting determination process of FIG. 5 discussed above.

In block 602, one or more operating states and/or performance factors are determined for the DSD. The operating states can include, for example, temperature conditions such as a temperature for one or more components of the DSD (e.g., junction temperatures of power management 122 and/or circuitry 120 in FIG. 1), one or more characteristics of a spindle motor that rotates the disk (e.g., a torque constant (Kt), a coil resistance, and/or an inductance), and/or one or more characteristics of a VCM that moves the at least one head (e.g., a torque constant, a coil resistance, and/or an inductance). The operating states may be measured by the circuitry of the DSD or estimated based on indirect measurements. Consideration of the operating states of the DSD in reducing the upper velocity limit can provide for an adjustable reduction in the upper velocity limit that may be tailored to the specific conditions or characteristics of the DSD, which may differ from those of another DSD of even for a DSD of the same model.

In some implementations, the operating states of the DSD can change over time as the VCM or spindle motor ages or degrades, for example. The operating states can affect the speed of the at least one head during the seek or during an EPO state, such as by affecting an acceleration or deceleration of the at least one head, a maximum velocity attainable by the at least one head or disk, an amount of current needed for the at least one head to reach a particular velocity, or a relationship between an amount of rotation of the disk before reaching the target location.

The performance factors determined in block 602 can include, for example, a data size for a command, a number of pending commands to be performed by the DSD, and/or a seek distance for the head to reach the target location to perform the command. In cases where the reduction in the upper velocity limit has less of an impact on performance (e.g., a lower effect on IOPS), the upper velocity limit may be reduced further to better safeguard the at least one head from damage during a potential EPO state.

For example, at least one of a data size for data to be read or written for a command being larger than a threshold data size, a number of pending commands to be performed being larger than a threshold number of commands, and/or a seek distance shorter than a threshold seek distance can favor further reducing the upper velocity limit since the lower velocity seek will have less of an overall impact on performance in these cases.

On the other hand, the upper velocity limit may be reduced less for cases where the overall effect on performance is greater due to the performance factors. In this regard, the overall performance of commands in terms of IOPS will be more impacted by smaller data sizes for commands, less pending commands in a command queue, and/or a longer seek distance since a greater percentage of the overall time for seeking and performing the command or commands is consumed by the seek time, as compared to when there are larger data sizes, more pending commands, and/or a shorter seek distance.

In block 604, the upper velocity limit is reduced based at least in part on the one or more operating states and/or performance factors determined in block 602. The operating states or performance factors in some implementations may be included as inputs for a function used to calculate the upper velocity limit or a velocity derating setting used to reduce the upper velocity limit. In some cases, the measured or determined operating state(s) or performance factor(s) may scale the reduction in the upper velocity limit or the velocity derating setting to increase or decrease the value of the upper velocity limit or velocity derating setting.

Those of ordinary skill in the art will appreciate with reference to the present disclosure that other implementations of the upper velocity limit reduction process of FIG. 6 may differ. For example, the process of FIG. 6 may be incorporated into the upper velocity limit reduction process of FIG. 4 or the velocity derating setting determination process of FIG. 5, such as by including block 604 as part of block 408 in FIG. 4 or as part of block 504 in FIG. 5.

In some implementations, the determination in block 602 may be performed less than the reduction of the upper velocity limit in block 604. For example, the one or more operating states and/or performance factors of the DSD may be determined periodically, after a certain number of operating hours, or after the performance of a certain number of commands, and then used for a large set of subsequent commands in determining upper velocity limits to seek to target locations for the commands. In some cases, such as with certain operating states that may not change frequently, such as characteristics of the VCM or of the spindle motor, the operating state may be determined once during factory testing and then used for the DSD throughout its usable life for reducing certain upper velocity limits.

Figure 7:
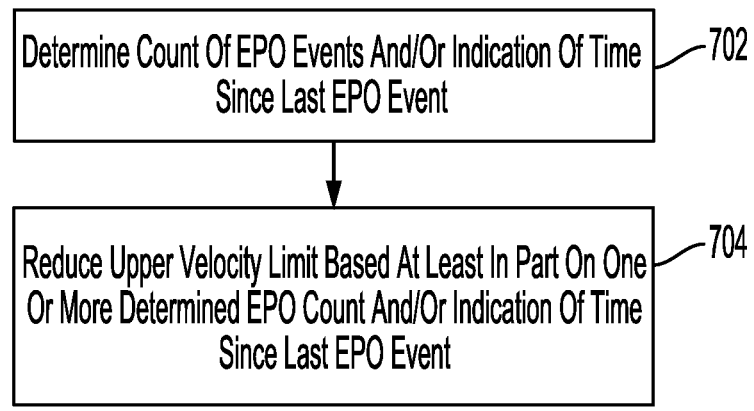
FIG. 7 is a flowchart for an upper velocity limit reduction process based on at least one of a determined Emergency Power Off (EPO) count and an indication of time since a last EPO event according to one or more embodiments.

FIG. 7 is a flowchart for an upper velocity limit reduction process based on at least one of a determined EPO count and an indication of time since a last EPO event according to one or more embodiments. The process of FIG. 7 can be performed by, for example, circuitry 120 of DSD 106 executing firmware 10 in FIG. 1. In this regard, circuitry 120 can, in some implementations, comprise a means for performing the functions of the upper velocity limit reduction process of FIG. 7. The process of FIG. 7 can, in some implementations, be performed in addition to or as part of the upper velocity limit reduction process of FIG. 4 or the velocity derating setting determination process of FIG. 5 discussed above.

In block 702, a count of EPO events and/or an indication of time since a last EPO event is determined. The count of EPO events can be a total count of EPO events for the DSD or may indicate a number of unexpected power losses that occurred within a most recent timeframe, such as within a number of operating hours. The indication of time since a last EPO event, in some implementations, can indicate whether an EPO event has occurred within a predetermined timeframe (e.g., within the past hour) or can indicate a time of a last EPO event. As discussed above, the use of EPO history (e.g., an EPO count and/or a time since a last EPO event) can facilitate adjustment of the upper velocity limit or velocity derating setting based on a cumulative effect of higher velocity ramp touches and/or a likelihood of future EPO events that may cause the at least one head to hit the ramp at a higher velocity than for typical head unloading during a controlled shutdown.

In block 704, the upper velocity limit is reduced based at least in part on the EPO count and/or the indication of time since the last EPO event determined in block 702. In some implementations, an EPO count below a threshold may allow for an upper velocity limit to be reduced less than it otherwise would if there were more EPO counts to improve performance. As the EPO count increases, the upper velocity limit can be reduced by more (e.g., a fractional increase in a disk revolution before reaching the target location) to offset a potential cumulative damaging effect on the at least one head during EPO states.

As another example, a time since a last EPO event within a predetermined time period may cause further reduction in the upper velocity limit than it otherwise would if there were no recent EPO events to protect against a cumulative effect of ramp touches during an EPO state. The EPO count or time since a last EPO event in some implementations may be used as inputs in a function used to calculate the upper velocity limit or a velocity derating setting for reducing the upper velocity limit. In some cases, the EPO count or time since the last EPO event may scale the reduction in the upper velocity limit or the velocity derating setting to increase or decrease the value of the upper velocity limit or velocity derating setting.

Those of ordinary skill in the art will appreciate with reference to the present disclosure that other implementations of the upper velocity limit reduction process of FIG. 7 may differ. For example, the process of FIG. 7 may be incorporated into the upper velocity limit reduction process of FIG. 4 or the velocity derating setting determination process of FIG. 5, such as by including block 704 as part of block 408 in FIG. 4 or part of block 504 in FIG. 5.

In some implementations, the determination in block 702 may be performed less than the reduction of the upper velocity limit in block 704. For example, the count of EPO events or time since a last EPO event may be updated with each EPO event, and then used for a large set of subsequent commands in determining upper velocity limits to seek to target locations for the commands.

The foregoing selective derating of head upper velocity limits can improve the overall performance of DSDs by not needing to slow all seeks to an OD region, while still safeguarding against a worst case scenario or timing for an EPO event. In addition, the foregoing derating of upper velocity limits can allow for fine-tuning of the upper velocity limit based on a relative position of the target location in the OD region, operating states of the DSD, performance factors of the DSD, and/or an EPO history of the DSD to further reduce the performance penalty for protecting the at least one head during potential EPO events.

OTHER EMBODIMENTS

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes processor or controller circuitry to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, processor circuitry, and controller circuitry described in connection with the examples disclosed herein may be implemented or performed with a general purpose processor, a GPU, a DSP, an ASIC, an FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. Processor or controller circuitry may also be implemented as a combination of computing devices, e.g., a combination of a DSP and a microprocessor, a plurality of microprocessors, an SoC, one or more microprocessors in conjunction with a DSP core, or any other such configuration.

The activities of a method or process described in connection with the examples disclosed herein may be embodied directly in hardware, in a software module executed by processor or controller circuitry, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to processor or controller circuitry such that the processor or controller circuitry can read information from, and write information to, the storage medium. In the alternative, the storage medium may be integral to processor or controller circuitry. The processor or controller circuitry and the storage medium may reside in an ASIC or an SoC.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive. In addition, the use of language in the form of "at least one of A and B" in the following claims should be understood to mean "only A, only B, or both A and B."

What is claimed is:

1. A Data Storage Device (DSD), comprising:
   a disk configured to store data;
   a spindle motor configured to rotate the disk;
   at least one head configured to read and write data on the disk;
   a Voice Coil Motor (VCM) configured to move the at least one head over the disk; and
   circuitry configured to:
      receive a command to read or write data at a target location in an Outer Diameter (OD) region of the disk;
      reduce an upper velocity limit for moving the at least one head to the target location, wherein the upper velocity limit is reduced in response to:
         a direction needed to move the at least one head to the target location being in an Inner Diameter (ID) to OD direction across the disk; and
         a starting position for moving the at least one head being at least as radially far from an OD region position as a predetermined threshold; and
      move the at least one head to the target location using the reduced upper velocity limit to perform the command.

2. The DSD of claim 1, wherein the OD region position corresponds to a boundary of the OD region, an annular track on the disk for the target location, or a predetermined position in the OD region.

3. The DSD of claim 1, wherein the circuitry is further configured to reduce the upper velocity limit based at least in part on a relative position of the target location within the OD region such that the target location being closer to an outer boundary of the OD region corresponds to a greater reduction in the upper velocity limit than for another target location in the OD region that is farther from the outer boundary.

4. The DSD of claim 1, wherein the circuitry is further configured to reduce the upper velocity limit by adjusting a setting for moving the at least one head to the target location that is associated with an amount of rotation of the disk before reaching the target location.

5. The DSD of claim 4, wherein the circuitry is further configured to use the adjusted setting as part of a Rotational Position Optimization (RPO) algorithm for scheduling commands performed by the DSD.

6. The DSD of claim 1, wherein the circuitry is further configured to:
   determine one or more operating states of the DSD including at least one of a temperature condition of the DSD, a characteristic of the spindle motor, and a characteristic of the VCM; and
   reduce the upper velocity limit based at least in part on the one or more determined operating states of the DSD.

7. The DSD of claim 1, wherein the circuitry is further configured to:
   determine one or more performance factors of the DSD including at least one of a data size for the command, a number of pending commands to be performed on the disk, and a radial distance for moving the at least one head the target location; and
   reduce the upper velocity limit based at least in part on the one or more determined performance factors of the DSD.

8. The DSD of claim 1, wherein the circuitry is further configured to:
   determine a count of Emergency Power Off (EPO) events for the DSD; and
   reduce the upper velocity limit based at least in part on the determined count of EPO events.

9. The DSD of claim 1, wherein the circuitry is further configured to:
   determine an indication of a time since a last Emergency Power Off (EPO) event for the DSD; and
   reduce the upper velocity limit based at least in part on the determined indication of the time since the last EPO event.

10. A method of operating a Data Storage Device (DSD), the method comprising:
   receiving a command to read or write data on a disk of the DSD;
   determining a velocity derating setting for moving at least one head of the DSD in an Inner Diameter (ID) to Outer Diameter (OD) direction across the disk to a target location in an OD region of the disk for performing the command, wherein the velocity derating setting is determined based at least in part on a starting position for moving the at least one head being at least as radially far from an OD region position as a predetermined threshold; and
   moving the at least one head to the target location based on the determined velocity derating setting to perform the command, wherein the velocity derating setting serves as a precautionary measure against damaging the at least one head during an Emergency Power Off (EPO) state of the DSD.

11. The method of claim 10, wherein the OD region position corresponds to a boundary of the OD region of the disk, the target location, or a predetermined position in the OD region.

12. The method of claim 10, further comprising determining the velocity derating setting based at least in part on a relative position of the target location in the OD region such that the target location being closer to an outer boundary of the OD region corresponds to a greater derating of an upper velocity limit than for another target location in the OD region that is farther from the outer boundary.

13. The method of claim 10, wherein the velocity derating setting is associated with an amount of rotation of the disk before reaching the target location.

14. The method of claim 13, further comprising using the velocity derating setting as part of a Rotational Position Optimization (RPO) algorithm for scheduling commands performed by the DSD.

15. The method of claim 10, further comprising:
determining one or more operating states of the DSD including at least one of a temperature condition of the DSD, a characteristic of a spindle motor configured to rotate the disk, and a characteristic of a Voice Coil Motor (VCM) configured to move the at least one head over the disk; and
determining the velocity derating setting based at least in part on the one or more determined operating states of the DSD.

16. The method of claim 10, further comprising:
determining one or more performance factors of the DSD including at least one of a data size for the command, a number of pending commands to be performed on the disk, and a radial distance for moving the at least one head to the target location on the disk for performing the command; and
determining the velocity derating setting based at least in part on the one or more determined performance factors of the DSD.

17. The method of claim 10, further comprising:
determining a count of EPO events for the DSD; and
determining the velocity derating setting based at least in part on the determined count of EPO events.

18. The method of claim 10, further comprising:
determining an indication of time since a last EPO event for the DSD; and
determining the velocity derating setting based at least in part on the determined indication of time since the last EPO event.

19. A Data Storage Device (DSD), comprising:
a disk configured to store data;
a spindle motor configured to rotate the disk;
at least one head configured to read and write data on the disk;
a Voice Coil Motor (VCM) configured to move the at least one head over the disk; and
means for:
reducing an upper velocity limit for moving the at least one head to perform a command to read or write data at a target location on the disk, wherein the reduction of the upper velocity limit serves as a precautionary measure against damaging the at least one head during an Emergency Power Off (EPO) state of the DSD; and
wherein the upper velocity limit is reduced in response to the target location being in an Outer Diameter (OD) region of the disk, a direction needed to move the at least one head to perform the command being in an Inner Diameter (ID) to OD direction across the disk, and a starting position for moving the at least one head being at least as radially far from an OD region position as a predetermined threshold.

20. The DSD of claim 19, wherein the means is further configured to reduce the upper velocity limit by adjusting a setting for moving the at least one head to the target location that is associated with an amount of rotation of the disk before reaching the target location.

* * * * *